(12) United States Patent
Kodimer et al.

(10) Patent No.: US 12,010,274 B1
(45) Date of Patent: Jun. 11, 2024

(54) SYSTEM AND METHOD FOR MULTIFUNCTION PERIPHERAL FLEET MANAGEMENT

(71) Applicant: Toshiba TEC Kabushiki Kaisha, Shinagawa-ku (JP)

(72) Inventors: Marianne Kodimer, Huntington Beach, CA (US); Grady Crossley, Lake Forest, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/369,437

(22) Filed: Sep. 18, 2023

(51) Int. Cl.
*H04N 1/00* (2006.01)

(52) U.S. Cl.
CPC ..... *H04N 1/00432* (2013.01); *H04N 1/00244* (2013.01); *H04N 1/00344* (2013.01); *H04N 1/00427* (2013.01); *H04N 2201/0094* (2013.01)

(58) Field of Classification Search
CPC .... G06F 18/2178; G06F 18/217; G06F 18/21; G06F 18/25; G06F 17/18; G06F 16/2477; G06F 2218/00; G06F 18/00; G06F 2211/005; G06F 21/62; G06F 16/288; G06F 16/27; G06F 21/12; G06F 21/14; G06F 21/53; G06F 21/6209; G06F 21/6218; G06F 2221/2113; G06F 8/53; G06F 16/51; G06F 16/583; G06F 16/5866; G06F 16/9554; G06F 16/9566; G06F 16/2379; G06F 16/9024; G06F 16/182; G06F 21/10; G06F 16/00; G06F 3/01; G06F 1/1626; G06F 16/2455; G06F 21/32; G06F 8/65; G06F 1/1684; G06F 16/2471; G06F 16/24; G06F 16/245; G06F 16/24537; G06F 16/24544; G06F 16/24552; G06F 16/2456; G06F 16/2462; G06F 16/278; G06F 21/31; G06F 1/1698; G06F 3/0231; G06F 16/23; G06F 16/258; G06F 3/1288; G06F 16/22; G06F 3/016; G06F 15/16; G06F 16/2255; G06F 21/34; G06F 21/41; G06F 21/6254; G06F 21/73; G06F 21/74; G06F 21/83; G06F 2221/2139; G06F 3/011; G06F 3/12;
(Continued)

(56) References Cited

U.S. PATENT DOCUMENTS 9,635,108 B2 * 4/2017 Thomas .................. H04L 67/06
9,729,746 B1 * 8/2017 Hong ..................... G06F 3/1288
(Continued)

*Primary Examiner* — Negussie Worku
(74) *Attorney, Agent, or Firm* — UB Greensfelder LLP; John X. Garred

(57) ABSTRACT

A system and method for multifunction peripheral fleet device management includes a cloud-based management system interacting with an administrator terminal. Lists or desired device information are assembled and displayed as tabbed entries. An initial or active tab is displayed first, along with a tab that includes a descriptive term for the associated list, along with a numeric count of list items. A search box is provided to allow for filtering a list when a number of entries is excessive for an item-by-item review. Other tabs, associated with other, hidden lists, are not populated until the active tab list is complete. A placeholder indicator is displayed until such time as each inactive tab is completely populated. If an inactive tab is selected prior to being populated, it is moved to a position for being populated next.

20 Claims, 8 Drawing Sheets

(58) Field of Classification Search
CPC .... G06F 9/5044; G06F 16/2329; G06F 16/28;
G06F 3/0346; G06F 3/1292; G06F
9/4881; G06F 9/5055; G06F 9/5077;
G06F 2009/45579; G06F 2009/45591;
G06F 21/55; G06F 21/575; G06F 3/1203;
G06F 3/1206; G06F 3/1222; G06F 3/126;
G06F 9/45558; G06F 16/951; G06F
21/604; G06F 3/04842; G06F 9/451;
G06F 11/3006; G06F 11/3409; G06F
11/3438; G06F 16/215; G06F 16/2282;
G06F 16/275; G06F 16/9535; G06F
16/9538; G06F 18/23; G06F 2009/45595;
G06F 21/44; G06F 3/0635; G06F 9/5072;
G06F 11/0706; G06F 11/0712; G06F
11/0751; G06F 11/0778; G06F 11/0781;
G06F 16/21; G06F 16/2228; G06F 21/57;
G06F 3/048; G06F 3/0482; G06F 3/1204;
G06F 3/1287; G06F 40/186; G06F 8/60;
G06F 1/1601; G06F 1/1632; G06F
1/1643; G06F 1/1673; G06F 1/169; G06F
1/3231; G06F 11/1458; G06F 16/1734;
G06F 16/1815; G06F 16/282; G06F
16/283; G06F 16/285; G06F 16/907;
G06F 18/2411; G06F 18/285; G06F
21/45; G06F 21/6263; G06F 21/86; G06F
21/88; G06F 2200/1637; G06F 2201/84;
G06F 2221/2111; G06F 2221/2145; G06F
3/017; G06F 3/0488; G06F 3/04883;
G06F 3/122; G06F 3/1257; G06F 3/1267;
G06F 3/1272; G06F 8/61; G06F 8/654;
G06F 9/00; G06F 9/452; G06F 9/54;
G06F 9/543; G06F 1/163; G06F 1/1637;
G06F 16/14; G06F 16/48; G06F 16/732;
G06F 16/783; G06F 18/213; G06F
21/105; G06F 21/54; G06F 21/572; G06F
21/602; G06F 21/606; G06F 21/6245;
G06F 21/64; G06F 21/78; G06F 21/84;
G06F 2113/10; G06F 2203/04804; G06F
2221/032; G06F 2221/2101; G06F
2221/2103; G06F 2221/2117; G06F
2221/2125; G06F 3/041; G06F 3/0484;
G06F 3/123; G06F 3/1231; G06F 3/1454;
G06F 30/27; G06F 40/117; G06F 8/34;
G06F 8/41; G06F 8/76; G06F 9/4401;
G06F 9/4451; G06F 9/45512; G06F
9/505; G06F 9/5083; G05B 19/41865;
G05B 23/0283; G05B 19/4183; G05B
23/0221; G05B 19/4184; G05B
2219/37351; G05B 23/0264; G05B
19/4185; G05B 2219/37434; G05B
23/0294; G05B 19/41845; G05B
19/41875; G05B 23/024; G05B 13/028;
G05B 2219/32287; G05B 2219/35001;
G05B 2219/37337; G05B 2219/40115;
G05B 2219/45004; G05B 2219/45129;
G05B 23/0229; G05B 23/0286; G05B
23/0289; G05B 23/0291; G05B 23/0297;
G05B 19/042; G05B 2219/37537; G05B
23/02; G05B 23/0208; G05B 13/0265;
G05B 15/02; G05B 19/0425; G05B
2219/25428; G05B 2219/33331; G05B
19/41885; G05B 2219/2642; G05B 17/02;
G05B 2219/31282; G05B 19/0426; G05B
19/4155; G05B 19/4188; G05B
2219/2614; G05B 19/4099; G05B 13/048;
G05B 19/418; G05B 2219/49023; G05B
19/406; G05B 2219/32014; G05B
2219/49007; G05B 2219/23456; G05B
2219/31368; G05B 2219/39146; G05B
13/04; G05B 23/0281; G05B 23/0216;
G05B 13/042; G05B 19/102; G05B
19/12; G05B 19/4083; G05B 23/0243;
G05B 23/0259; G05B 13/027; G05B
19/0428; G05B 2219/23026; G05B
2219/23068; G05B 2219/23386; G05B
2219/24015; G05B 2219/31001; G05B
2219/31356; G05B 2219/32187; G05B
2219/32234; G05B 2219/37435; G05B
23/0237; G05B 23/0272; G05B 13/026;
G05B 2219/31156; G05B 2219/33039;
G05B 19/41855; G05B 2219/2645; G05B
2219/31391; G05B 2219/33273; G05B
15/00; G05B 19/402; G05B 19/4097;
G05B 19/4186; G05B 2219/23298; G05B
2219/24019; G05B 2219/25064; G05B
2219/31018; G05B 2219/31457; G05B
2219/31467; G05B 2219/32015; G05B
2219/32036; G05B 2219/34039; G05B
2219/35134; G05B 2219/36252; G05B
2219/40113; G05B 23/0205; G06Q 30/02;
G06Q 30/06; G06Q 10/04; G06Q
10/0639; G06Q 30/0278; G06Q 50/00;
G06Q 10/20; G06Q 10/087; G06Q 10/06;
G06Q 10/06315; G06Q 2220/00; G06Q
30/0201; G06Q 10/0631; G06Q 30/0206;
G06Q 10/067; G06Q 50/04; G06Q
10/06316; G06Q 30/016; G06Q 30/0202;
G06Q 30/0283; G06Q 10/0833; G06Q
20/389; G06Q 10/0637; G06Q 30/0241;
G06Q 10/06311; G06Q 50/08; G06Q
10/063118; G06Q 10/06375; G06Q
10/063; G06Q 10/10; G06Q 30/0625;
G06Q 40/04; G06Q 10/06314; G06Q
10/1095; G06Q 30/0282; G06Q 30/0611;
G06Q 30/08; G06Q 10/0635; G06Q
10/101; G06Q 10/02; G06Q 10/06313;
G06Q 10/08; G06Q 10/083; G06Q
10/107; G06Q 30/00; G06Q 10/103;
G06Q 30/0643; G06Q 50/26; G06Q
10/063114; G06Q 10/30; G06Q 20/123;
G06Q 20/1235; G06Q 20/306; G06Q
20/384; G06Q 30/0603; G06Q 30/0613;
G06Q 50/01; G06Q 50/06; G06Q 50/22;
G06Q 10/06312; G06Q 10/0633; G06Q
10/06395; G06Q 10/06398; G06Q
10/0831; G06Q 10/0875; G06Q 20/02;
G06Q 20/14; G06Q 20/18; G06Q 20/22;
G06Q 20/308; G06Q 20/3223; G06Q
30/01; G06Q 30/0645; G06Q 40/06;
G06Q 50/02; H04B 17/309; H04B
17/318; H04B 17/345; H04B 17/29;
H04B 17/40; H04B 17/23; H04B 17/26;
H04B 5/0031; H04B 5/0062; H04B
17/3913; H04N 23/675; H04N 21/41265;
H04N 21/4147; H04N 21/422; H04N
21/42201; H04N 21/4223; H04N
21/4333; H04N 21/4334; H04N 21/4405;
H04N 21/4623; H04N 21/47214; H04N
2201/0094; H04N 1/00244; H04N 1/00307; H04N 23/63; H04N 23/64;
H04N 1/00031; H04N 1/00039; H04N
1/00344; H04N 1/00973; H04N
21/42224; H04N 21/43072; H04N
21/436; H04N 21/4627; H04N 21/4788;
H04N 21/835; H04N 1/00347; H04N
1/00938; H04N 1/4413; H04N 19/00;
H04N 19/172; H04N 19/184; H04N
21/21; H04N 21/278; H04N 21/4332;
H04N 21/43615; H04N 21/4363; H04N
21/44227; H04N 21/4622; H04N
21/47217; H04N 21/4722; H04N 21/485;
H04N 21/60; H04N 21/6125

See application file for complete search history.

(56) References Cited

U.S. PATENT DOCUMENTS

| | | | |
|---|---|---|---|
| 10,027,841 B1* | 7/2018 | Kodimer | H04N 1/00344 |
| 10,769,565 B2* | 9/2020 | Jensen | H04L 43/08 |
| 2004/0161257 A1* | 8/2004 | Ishihara | G06K 15/00 |
| | | | 399/81 |
| 2021/0092116 A1* | 3/2021 | Zimmermann | H04L 63/0823 |
| 2022/0337664 A1* | 10/2022 | Takemura | H04L 41/0806 |
| 2023/0171319 A1* | 6/2023 | Ota | H04L 63/0869 |
| | | | 709/201 |

* cited by examiner

DEVICES | UPDATES QUEUE | POLICIES | REPORTS | METER COLLECTION | MASTER CLONES
Hello, snmp@————.com ▶

▶ All Devices
704' 616'  620'

Device Actions ▼  ▢ ▶   ⟲ Refresh Device Data
Active (107211) ▼   Inactive (--)   Shared (--) 624'

Enter a Search Form   ⊗

<<  <  1 2 3 4 5 6 7 8 9  >  >>
0 Selected   107211 Total   Go to Page: 1

| | Serial Number | Model | Customer | Policy | Status | IP Address |
|---|---|---|---|---|---|---|
| ▢ 🖨 | 222N10009 708 | DL1024 712 | DSE TEST1 | | | *(No IP Address Assigned)* Edit |
| ▢ 🖨 | 222N10008 | DL 1024 | DSE TEST1 | | ••• | *(No IP Address Assigned)* Edit |
| ▢ 🖨 | CTEM12727 | ESTUDIO2528A | TABS (Cust#45662) | | ••• | 10 1 54 221 |
| ▢ 🖨 | CSII02616 | ESTUDIO6525 | Brand New EBNR427 | | ••• | 10 1 54 220 |
| ▢ 🖨 | CFLG69175 | ESTUDIO2505AG | TOSHIBA AMERICA BUS SOL INC | 📄!@5%^*()_ +>?"{} /[]dff 5 min | ••• ●2 Policy Violations | 10 1 54 71 |
| ▢ 🖨 | CTGK00009 | ESTUDIO4528A | APPALACHIA BUSINESS | 📄Dev Comm 4 | ••• | 218 44 244 70 |

SYSTEM AND METHOD FOR MULTIFUNCTION PERIPHERAL FLEET MANAGEMENT

TECHNICAL FIELD OF THE INVENTION

This application relates generally to management of multifunction peripherals. The application relates more particularly to a fleet management system with increased usability and efficiency.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Monitoring of MFPs for device status or usage can be done over a network. Monitoring may be done remotely, such as via a wide area network (WAN) connection which may comprise the Internet. A suitable device monitoring system, such as Toshiba's eBridge Cloud Connect (ECC) application, provides a platform to which MFP devices can connect to and receive remote troubleshooting and maintenance. Using this technology, technicians no longer need to be on site to provide technical support. Rather, technicians and service providers can simply analyze service files sent from the devices and deliver patch fixes through the cloud platform. This provides the benefits of reducing cost on maintenance operations and improving customer experience with greater service responsiveness.

While ECC is used in example embodiments herein, it is to be appreciated that any suitable device administration device or portal may be used. Other examples include HP JetAdvantage and Xerox Managed Print Services.

BRIEF DESCRIPTION OF THE DRAWINGS

Various embodiments will become better understood with regard to the following description, appended claims and accompanying drawings wherein:

FIG. 8 is another example embodiment of an administrator user interface display.

DETAILED DESCRIPTION OF THE INVENTION

Figure 1:
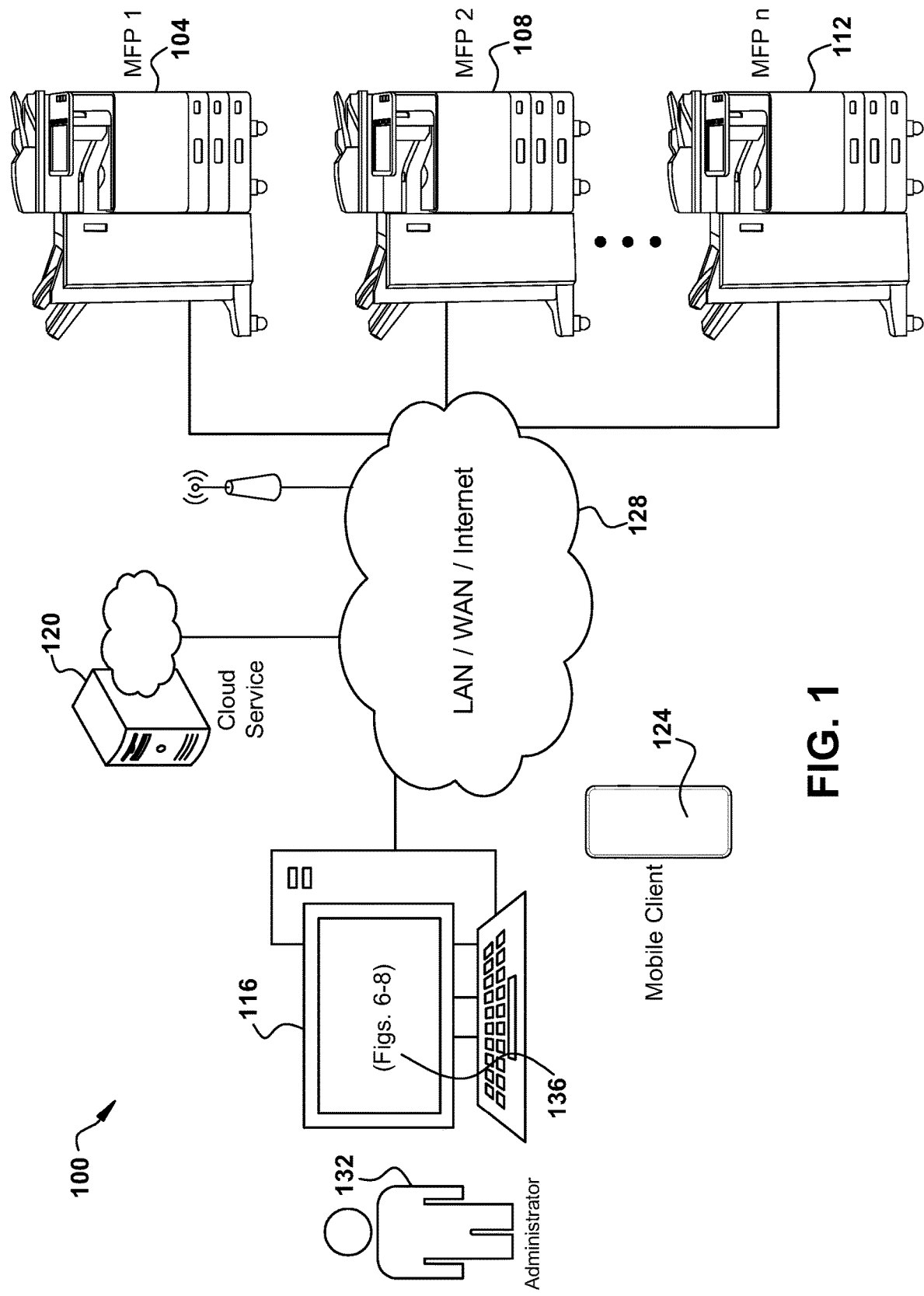
FIG. 1 is an example embodiment of a system for multifunction peripheral fleet management.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Remote MFP administration, such as via ECC as noted above, functions via a management terminal operated by an administrative user. MFP management may include areas such as:

Remote Device Monitoring: This feature allows you to remotely track the status and performance of your MFP fleet. Metrics such as usage patterns, error codes, supplies levels, and maintenance requirements can be continuously monitored.

Automated Supplies Replenishment: The system is designed to automatically keep track of the levels of toner and supplies in your connected devices. When these levels drop below a certain threshold, the system initiates an automated reordering process to ensure that supplies are always available.

Proactive Maintenance: A system can alert you to upcoming maintenance needs or potential issues. This proactive approach enables you to schedule maintenance tasks before they develop into more significant problems.

Usage Analysis and Reporting: The managed services provide tools for analyzing and reporting on how an MFP fleet is being utilized. This data-driven insight aids in making informed decisions regarding resource allocation and identifying opportunities for cost savings.

Security and Access Control: Managed services include security features such as user authentication, secure print release, and document encryption. These measures help safeguard sensitive information.

Device Configuration Management: Through a central dashboard, systems manage and update the configuration settings of an MFP fleet remotely. This ensures consistent settings across all devices.

Firmware and Software Updates: Managed services enable one to centrally manage and deploy firmware and software updates to keep your MFP fleet current with the latest features and security patches.

Remote Troubleshooting and Diagnostics: Administrators have the capability to diagnose and troubleshoot issues remotely, minimizing downtime and reducing the need for on-site visits.

Cost Management and Control: The suite includes tools for tracking and managing printing costs accurately. This feature facilitates the allocation of expenses and implementation of cost-saving measures.

Device Policy Control: Device policies refer to a sets of rules, settings, and configurations that govern the use and management of multi-function printers within an organization. Device policies are implemented to ensure that devices are used efficiently, securely, and in compliance with organizational policies.

User Authentication and Access Tracking: The managed services offer user authentication mechanisms and activity tracking to ensure that only authorized users access MFP functions.

With such diverse functionality, it is to be appreciated that large amounts of data must be retrieved and displayed. Time is required to retrieve, organize and display such information. When an administrator has a certain task in mind, or a certain order of tasks, they may have to wait a considerable time before they can commence work since the required information is not yet assembled and displayed. Also, managing large fleets of MFPs for many customers can result in obtaining and displaying information that, while accurate relative to an information category, is only needed for a subset of devices. Defining such a subset may be discretionary to an administrator. By way of example, if there are relatively few devices in a selected list, the administrator may simply scroll through the list and addresses the devices as needed. However, a device list has hundreds, or thousands of entries making a complete list scroll impractical.

In cloud-based applications, tabs can be used to organize groups of listed device data on an administrator's workstation. Updating each device list across multiple tabs and the associated count label in a timely manner is difficult due to the backend processing required to update the associated user interface. Example embodiments here implement a user interface and associated backend processing that allows updated lists with associated count labels to be shown in a timely manner asynchronously. Current (in focus) tab list items and associated count label is processed and presented first. Further, a placeholder count label is presented while the system is processing, to communicate to the user that the system is busy. Presentation of the count of items is displayed as part of in tab category label. The device count is updated of the count in response to presentation of contained data including search/filter when provided, item deletion, item addition, and the like. Visual indication of "processing" state in tabs where count is not yet calculated.

FIG. 1 illustrates an example embodiment of a system for MFP fleet management 100. One or more MFPs, such as MFPs 104, 108 and 112 are in data communication with one another, along with administrator workstation 116, cloud server 120, and mobile client 124 via network cloud 128. Network cloud 128 is suitably comprised of a local area network (LAN), a wide area network (WAN), which may comprise the Internet, or any suitable combination thereof. Network cloud 128 is comprised of any suitable wireless or wired data connection or combination thereof. Cloud server 120 suitably provides network management service such as via Toshiba's eBridge Cloud Connect (ECC) application which facilitates capture and transmission of device data from managed MFPs. Administrative user 132 interacts with administrator workstation 116 via a user interface that includes display 136, the generation and content of which will be detailed below.

Figure 2:
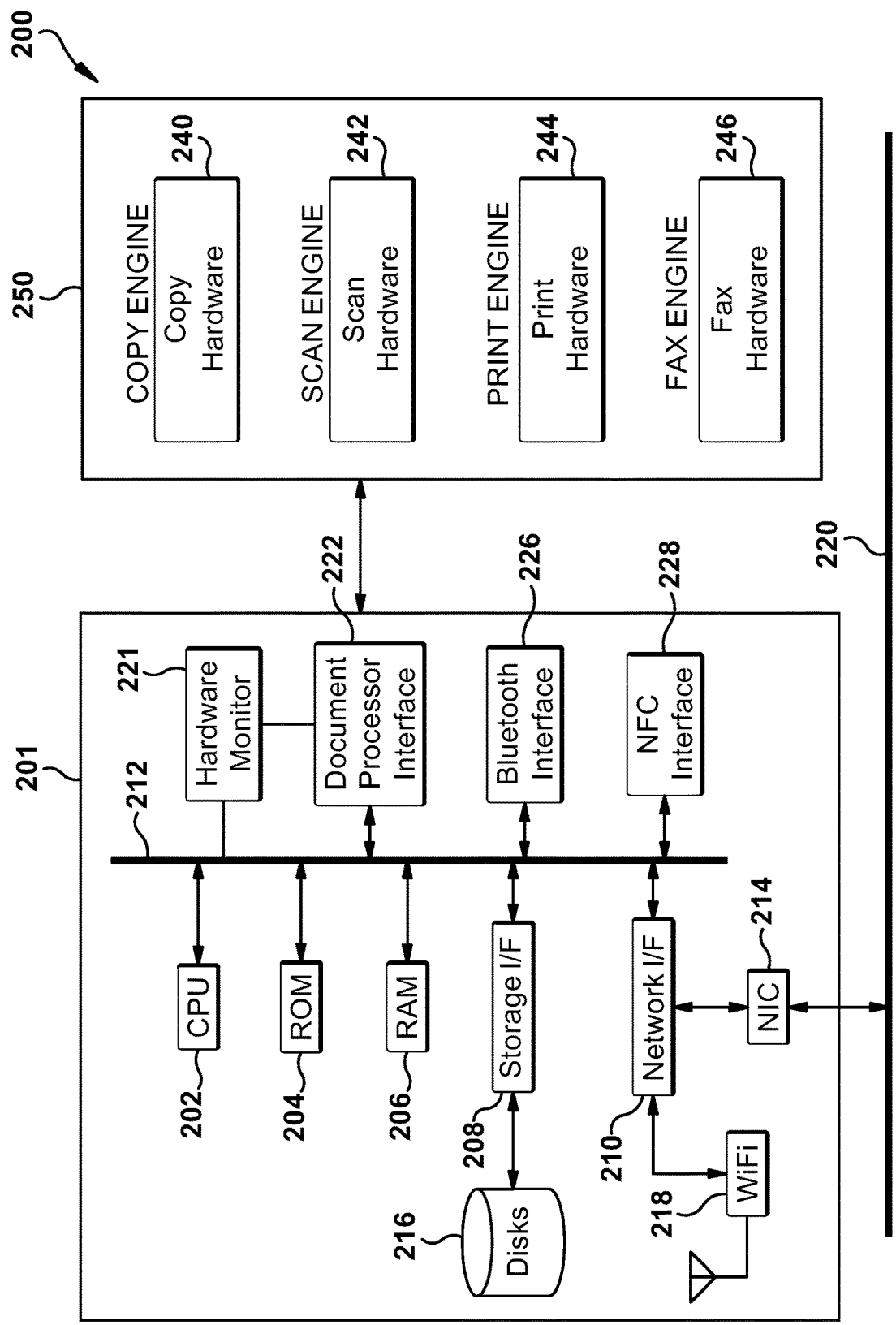
FIG. 2 is an example embodiment of a networked digital device, such as a multifunction peripheral.

Turning now to FIG. 2, illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 226, such as a Bluetooth interface, which provides data communication for interfacing with user peripherals, such as displays, keyboards, mice, track balls, touch screens, or the like. Processor 202 can also be in communication with hardware monitor 221, such as a page counter, temperature sensor, toner or ink level sensor, paper level sensor, or the like.

Also in data communication with data bus 212 is a document processor interface 222 suitable for data communication with the document rendering system 250, including MFP functional units. In the illustrated example, these units include a copy engine comprising copy hardware 240, a scan engine comprise of scan hardware 242, a print engine comprised of print hardware 244 and a fax engine comprised of fax hardware 246 which together comprise the document rendering system 250. It will be understood that functional units are suitably comprised of intelligent units, including any suitable hardware or software platform.

Figure 3:
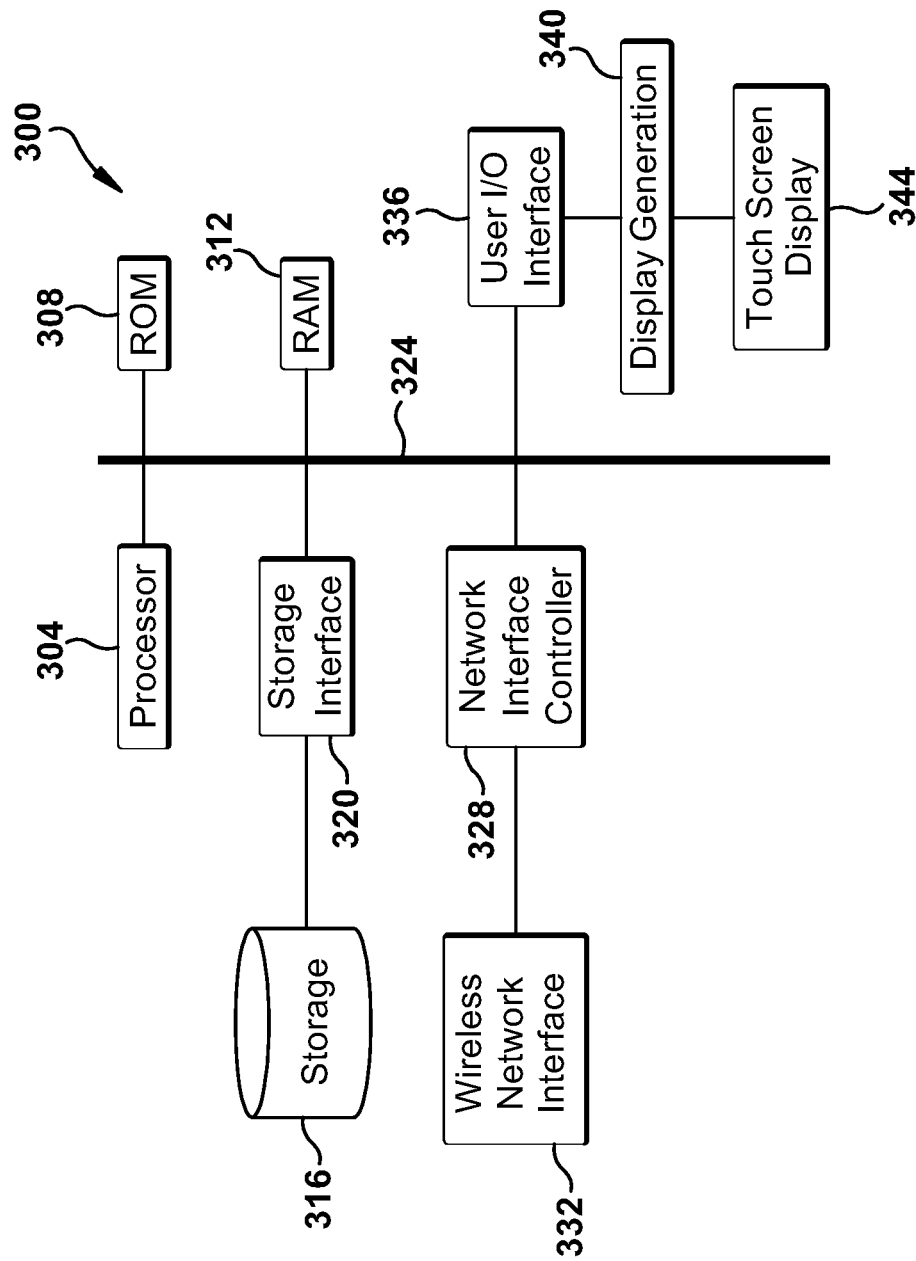
FIG. 3 is an example embodiment of a digital device system.

Turning now to FIG. 3, illustrated is an example embodiment of a digital data processing device 300 such as administrator workstation 116, cloud server 120 or mobile client 124 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Such storage is suitably non-transitory and suitable for application and data storage. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used.

Figure 4:
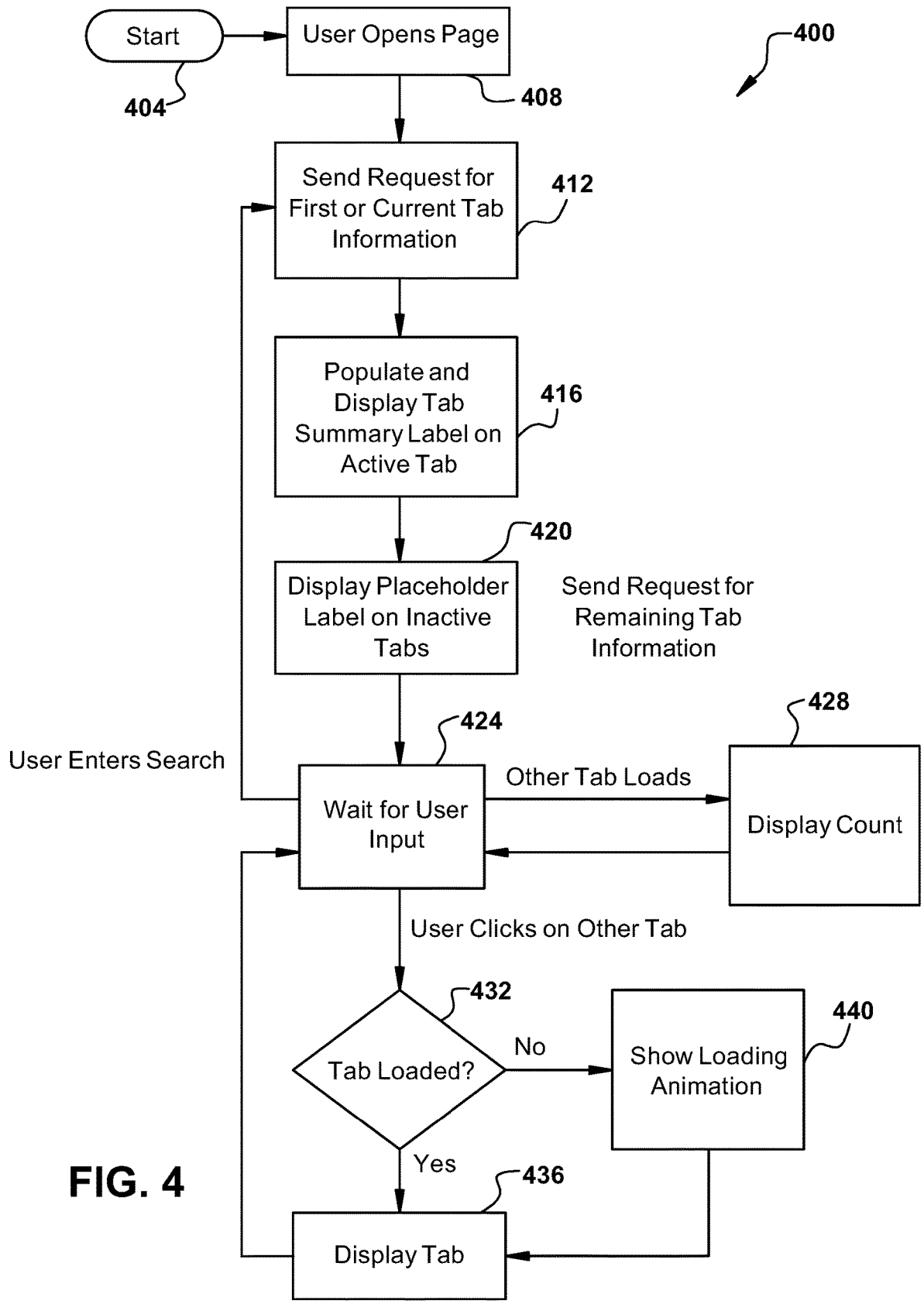
FIG. 4 illustrates flowchart for an example embodiment of a fleet management system.

FIG. 4 illustrates flowchart 400 for an example embodiment of a fleet management system. The process commences at block 404 and proceeds to block 408 where an administrator opens a page for viewing MFP device information. Example device information may include device serial numbers, model numbers, customer name, policy settings, device status, device network address, and the like. Next, the administrator sends a request to a cloud management server for information at block 412 which provides an initial display of items responsive to the request. This is suitably tabbed as active and open. Next, at block 416, the display is populated with list items along with a tab summary label that may include a category name. The tab summary label is also provided with a current count of items in the list.

Next, a request for remaining tab information is sent at block 420 for any additional categories or items of interest to the administrator. The process then proceeds to block 424 to await user input. When the administrator issues search criteria to filter the active list, the system applies the filter and returns to block 412 to generate the filtered list. While waiting for user input at block 424, other background tabs are loaded with list counts appended to the tab label as they become available at block 428. When a user clicks on another tab, the process proceeds to block 432 where a test is made to determine whether the items in the selected tab are fully loaded. If so, the process moves to block 436 where the selected tab, tab count and list items are displayed. The process then returns to block 424 to await further user input. If the tab is not yet fully loaded at block 432, a place holder, such as an animation or message, is substituted for the currently unavailable list item count information at block 440.

Figure 5:
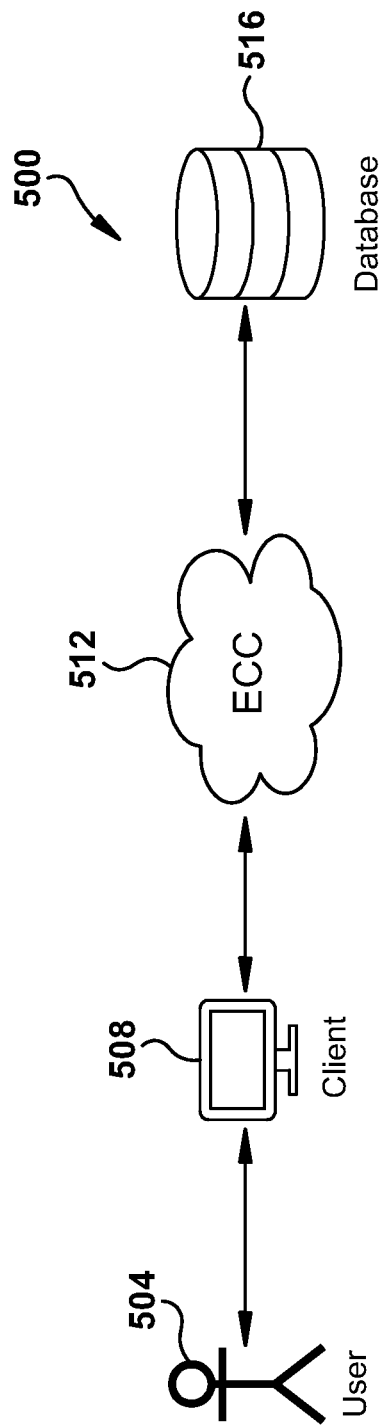
FIG. 5 is an example embodiment of a system diagram for a multifunction peripheral management system.

FIG. 5 illustrates an example embodiment of a system diagram 500 for an MFP management system such as that detailed herein. User 504 interacts with digital client 508 to access MFP service cloud 512, such as by use of the noted ECC system noted above. MFP service cloud 512 secures device information for managed MFPs via database 516. Such information may be pre-stored, such as customer information and device identification information. Other information may be secured by polling MFPs themselves or by MFP reports pushed to the database.

Figure 6:
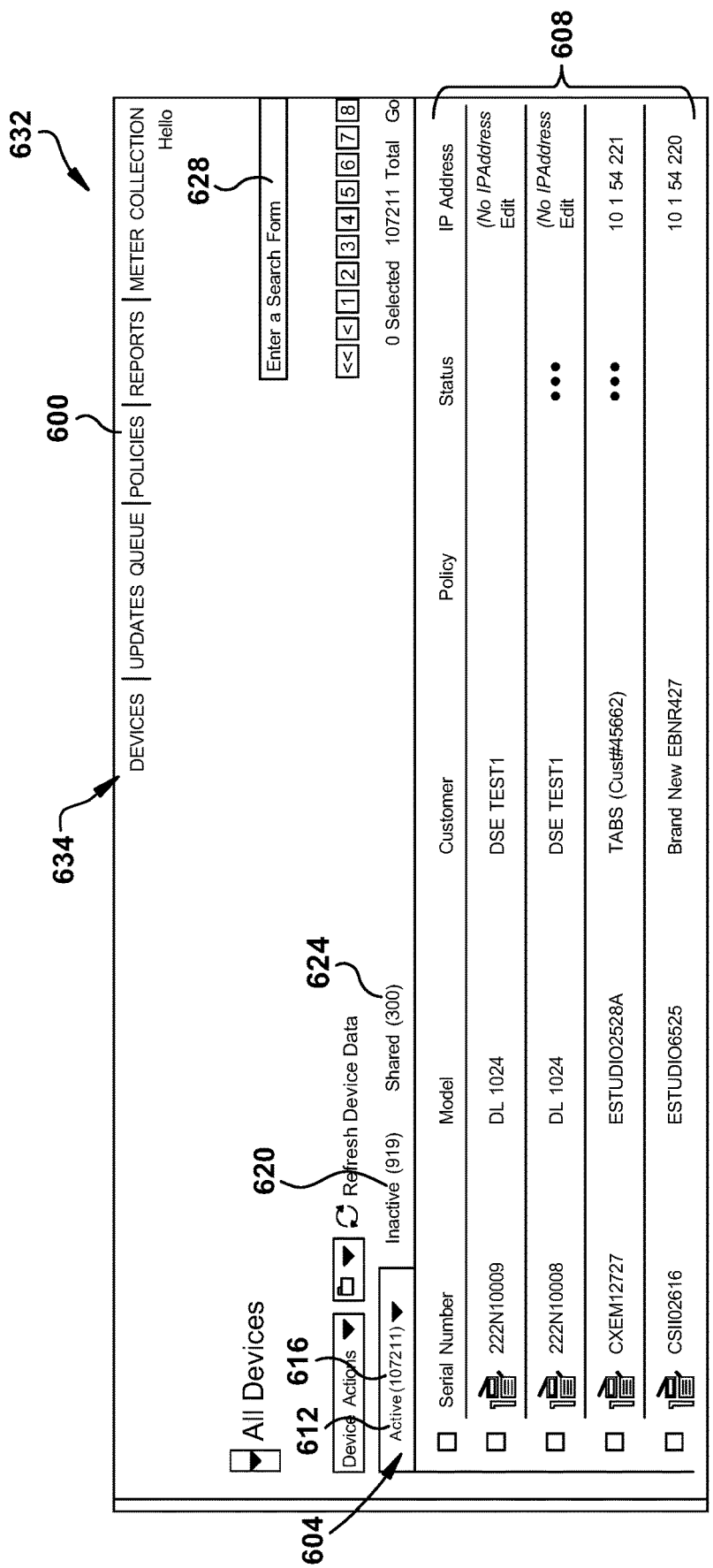
FIG. 6 is an example embodiment of an administrator user interface display.

FIG. 6 illustrates an example embodiment of an administrator user interface display, such as display 136 of FIG. 1. The example display shows three tabs. In focus tab 604 includes a label for an associated item list 608, the label including text 612 showing that the associated list is for active devices. Numeric entry 616 indicates the number of entries in the list as being 107,211. As noted above, such a large number of entries makes it impractical to scroll through an entire list. Tabs 620 and 624 indicate their associated, hidden content label, along with their associated item list count. Tab 620 denotes that its associated, currently hidden, list is for 919 inactive devices. Tab 624 denotes that its associated, currently hidden, list is for 300 shared devices. Text box 628 allows for entry of search terms to build or filter a list as desired. Additional management functions 634 allow for administrative actions, such as device management, queue updates, policy control, report generation of device meter collection.

Figure 7:
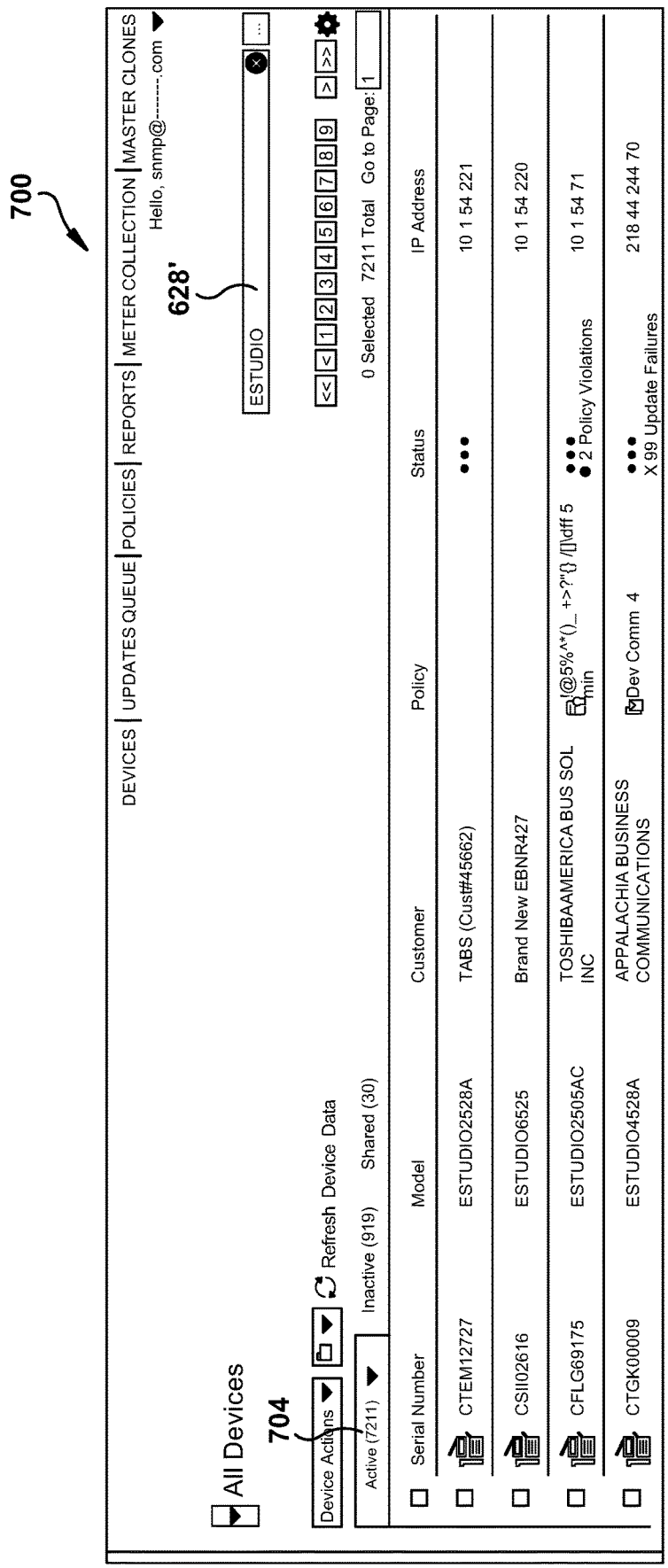
FIG. 7 is another example embodiment of an administrator user interface display.

FIG. 7 shows administrative user interface display 700 wherein a search term "ESTUDIO" has been introduced into box 628' and applied to item list 608, resulting in an updated item list count 704 of 7,211 entries.

FIG. 8 shows administrative user interface display 800 where in focus tab 704' has been supplied with list item count 616' first as being the active tab. Numeric list entry counts for background tabs 620' and 624' are provided with placeholders 708 and 712, respectively, indicating that their associated list content is not yet completely loaded. The placeholder is suitably any static image or moving animation indicative of an list build in progress.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor;
a network interface;
a memory configured to receive device information corresponding to each of a plurality of multifunction peripherals, wherein the device information is organized in a plurality of categories; and
a user interface including a user input and a display;
wherein the processor is configured to:
receive a management session request from an associated user via the user interface,
showing a tabbed image on the display, each tabbed image associated with a different category,
determine an open tab among the tabbed images, wherein information relative to the open tab is displayable and information relative to remaining tabs is hidden,
retrieve device information associated with the open tab,
show a list of retrieved device information on the display,
show indicia corresponding to a number of entries in a list on the open tab,
retrieve device information associated with unopened tabs,
show placeholder indicia corresponding to a number of devices in each unopened tab while the device information associated with the unopened tabs is being retrieved, and
replace the placeholder indicia from each unopened tab with indicia corresponding to the number of entries in each unopened tab after its associated device information has been retrieved.

2. The system of claim 1 wherein the processor is further configured to:
receive the user input comprising selection of a newly opened tab,
retrieve any missing device information required for the newly opened tab,
showing the list of retrieved device information for the newly opened tab, and
show indicia on the newly opened tab corresponding to the number of devices listed in the newly opened tab.

3. The system of claim 2 wherein the processor is further configured to:
receive a search term from a user via the user interface,
filter a list currently shown on the display in accordance with a received search term, and,
generate a revised list in accordance with the received search term,
show the revised list on the display, and
update a tab associated with the revised list to show the number of entries in the revised list.

4. The system of claim 3 wherein the processor is further configured to:
receive a user selection for deletion of a list entry of a revised search shown on the display,
delete the list entry selected for deletion, and
update the tab associated with the revised list to show a current number of entries in a revised list after deletion.

5. The system of claim 4 wherein the processor is further configured to:
receive a new list entry from the user,
add the new list entry to the revised list, and
update the tab associated with the revised list to show a current number of entries after addition of the new list entry.

6. The system of claim 5 wherein device information includes one or more of device serial number, device model number, device customer, device policy, device status and device network address.

7. The system of claim 4 wherein the device information is obtained from a cloud device management service.

8. A method comprising:
receiving a management session request from an associated user via a user interface,
receiving, into a memory, device information corresponding to each of a plurality of multifunction peripherals, wherein the device information is organized in a plurality of categories
showing a tabbed image on a display, each tabbed image associated with a different category,
determining an open tab among the tabbed images, wherein information relative to the open tab is displayable and information relative to remaining tabs is hidden,
retrieving device information associated with the open tab,
showing a list of retrieved device information on the display,
show indicia corresponding to a number of entries in a list on the open tab,
retrieving device information associated with unopened tabs,
showing placeholder indicia corresponding to a number of devices in each unopened tab while the device information associated with the unopened tabs is being retrieved, and
replacing placeholder indicia from each unopened tab with indicia corresponding to the number of entries in each unopened tab after its associated device information has been retrieved.

9. The method of claim 8 further comprising:
receiving user input comprising selection of a newly opened tab,
retrieving any missing device information required for the newly opened tab,
showing the list of retrieved device information for the newly opened tab, and
showing indicia on the newly opened tab corresponding to the number of devices listed in the newly opened tab.

10. The method of claim 9 further comprising
receiving a search term from a user via the user interface,
filter a list currently shown on the display in accordance with a received search term, and,
generating a revised list in accordance with the received search term,
showing the revised list on the display, and
updating a tab associated with the revised list to show the number of entries in the revised list.

11. The method of claim 10 further comprising:
receiving a user selection for deletion of a list entry of a revised search shown on the display,
deleting the list entry selected for deletion, and
updating the tab associated with the revised list to show a current number of entries in a revised list after deletion.

12. The method of claim 11 further comprising:
receiving a new list entry from the user,
adding the new list entry to the revised list, and
updating the tab associated with the revised list to show a current number of entries after addition of the new list entry.

13. The method of claim 12 wherein device information includes one or more of device serial number, device model number, device customer, device policy, device status and device network address.

14. The method of claim 13 further comprising obtaining the device information from a cloud device management service.

15. A non-transitory computer readable storage medium storing a program for causing a networked computer to execute a control method, the control method comprising:
receiving, into a memory, device information corresponding to each of a plurality of multifunction peripherals, wherein the device information is organized in a plurality of categories
showing a tabbed image on a display, each tabbed image associated with a different category,
determining an open tab among the tabbed images, wherein information relative to the open tab is displayable and information relative to remaining tabs is hidden,
retrieving device information associated with the open tab,
showing a list of retrieved device information on the display,
show indicia corresponding to a number of entries in a list on the open tab,
retrieving device information associated with unopened tabs,
showing placeholder indicia corresponding to a number of devices in each unopened tab while the device information associated with the unopened tabs is being retrieved, and
replacing placeholder indicia from each unopened tab with indicia corresponding to the number of entries in each unopened tab after its associated device information has been retrieved.

16. The non-transitory computer readable storage medium of claim 15 wherein the control method further comprises:
retrieving any missing device information required for a newly opened tab,
showing the list of retrieved device information for the newly opened tab, and
showing indicia on the newly opened tab corresponding to the number of devices listed in the newly opened tab.

17. The non-transitory computer readable storage medium of claim 16 wherein the control method further comprises:
receiving a search term from a user via a user interface,
filter a list currently shown on the display in accordance with a received search term, and,
generating a revised list in accordance with the received search term,
showing the revised list on the display, and
updating a tab associated with the revised list to show the number of entries in the revised list.

18. The non-transitory computer readable storage medium of claim 17 wherein the control method further comprises:
receiving a user selection for deletion of a list entry of a revised search shown on the display,
deleting the list entry selected for deletion, and updating the tab associated with the revised list to show a current number of entries in a revised list after deletion.

19. The non-transitory computer readable storage medium of claim 18 wherein the control method further comprises:
receiving a new list entry from the user,
adding the new list entry to the revised list, and
updating the tab associated with the revised list to show a current number of entries after addition of the new list entry.

20. The non-transitory computer readable storage medium of claim 19 wherein device information includes one or more of device serial number, device model number, device customer, device policy, device status and device network address.

* * * * *